United States Patent
Carnelos et al.

(10) Patent No.: US 10,827,838 B2
(45) Date of Patent: Nov. 10, 2020

(54) JOINING DEVICE, PARTICULARLY FOR JOINING A SHELF TO A WALL OF A PIECE OF FURNITURE

(71) Applicant: FERRAMENTA LIVENZA-SOCIETA' A RESPONSABILITA' LIMITATA, Brugnera (IT)

(72) Inventors: Luca Carnelos, Polcenigo (IT); Simone Della Rosa, Fontanafredda (IT); Giulio Durigon, San Vito Al Tagliamento (IT); Abramo Ivan, Porcia (IT); Davide Verziagi, Fontanafredda (IT); Christian Zonta, Sesto Ai Reghena (IT)

(73) Assignee: FERRAMENTA LIVENZA—SOCIETA' A RESPONSABILITA' LIMITATA, Brugnera (IT)

( * ) Notice: Subject to any disclaimer, the term of this patent is extended or adjusted under 35 U.S.C. 154(b) by 435 days.

(21) Appl. No.: 15/739,637

(22) PCT Filed: Jun. 28, 2016

(86) PCT No.: PCT/EP2016/065045
§ 371 (c)(1),
(2) Date: Dec. 22, 2017

(87) PCT Pub. No.: WO2017/001420
PCT Pub. Date: Jan. 5, 2017

(65) Prior Publication Data
US 2018/0168348 A1 Jun. 21, 2018

(30) Foreign Application Priority Data
Jun. 29, 2015 (IT) .................. 102015000028413

(51) Int. Cl.
*A47B 96/06* (2006.01)
*F16B 12/20* (2006.01)

(52) U.S. Cl.
CPC ........ *A47B 96/066* (2013.01); *F16B 12/2063* (2013.01); *Y10T 403/553* (2015.01)

(58) Field of Classification Search
CPC ..... A47B 96/027; A47B 96/066; A47B 57/42; A47F 5/0043; A47F 57/42; A47F 5/008;
(Continued)

(56) References Cited

U.S. PATENT DOCUMENTS 5,743,670 A 4/1998 Ader
6,890,121 B2 * 5/2005 Mauri ................ F16B 12/2063
403/382

FOREIGN PATENT DOCUMENTS

CN 104736294 A 6/2015
DE 819146 C * 10/1951 .......... F16B 12/2063
(Continued)

OTHER PUBLICATIONS

International Search Report dated Sep. 14, 2016 re: Application No. PCT/EP2016/065045; pp. 1-3; citing: US 5 743 670 A, EP 1 469 206 A1, WO 2008/076089 A2.
(Continued)

*Primary Examiner* — Josh Skroupa
(74) *Attorney, Agent, or Firm* — Cantor Colburn LLP

(57) ABSTRACT

A joining device, particularly for joining a shelf to a wall of a piece of furniture, includes a cylindrical body that can be associated in a first hole adapted to be provided transversely in the shelf and provided with a first axial seat for the rotatable coupling of the first stem of a screw provided with a first crown-shaped head that can be arranged rotatably within a second seat that is adjacent to the first seat. The cylindrical body is provided with a third seat, which is
(Continued)

perpendicular and connected to the second seat, for the temporary coupling of a pinion, which interacts with the first crown-shaped head, which protrudes externally to the cylindrical body and is accommodated within a second hole.

10 Claims, 4 Drawing Sheets

(58) Field of Classification Search
CPC ............... A47F 5/0614; F16B 12/2027; F16B 12/2036; F16B 12/2054; F16B 12/2063; F16B 5/008; F16B 5/0614; Y10T 403/4602; Y10T 403/553; Y10T 403/556; Y10T 403/7096; Y10T 403/73
USPC ........ 403/231, 294, 296, 382, 403, DIG. 10, 403/DIG. 12
See application file for complete search history.

(56) References Cited

FOREIGN PATENT DOCUMENTS

| DE | 29706887 U1 * | 6/1997 | .......... F16B 12/2027 |
|---|---|---|---|
| EP | 1469206 A1 | 10/2004 | |
| FR | 1331299 A * | 6/1963 | ............ F16B 5/0614 |
| WO | 2008076089 A2 | 6/2008 | |
| WO | WO-2009146503 A1 * | 12/2009 | .......... F16B 12/2063 |

OTHER PUBLICATIONS

Written Opinion dated Sep. 14, 2016 re: Application No. PCT/EP2016/065045; pp. 1-5; citing: US 5 743 670 A, EP 1 469 206 A1, WO 2008/076089 A2.

* cited by examiner

JOINING DEVICE, PARTICULARLY FOR JOINING A SHELF TO A WALL OF A PIECE OF FURNITURE

TECHNICAL FIELD

The present disclosure relates to a joining device, particularly for joining a shelf to a wall of a piece of furniture.

BACKGROUND

Currently, Italian utility model no. 262995, filed with application PN2005U000035, is known which claims a joint, for the detachable connection of two structural elements of a piece of furniture that mutually abut at right angles, comprising an accommodation body that can be associated with a first structural element and is adapted to engage a fixing element that can be associated with a second structural element and an actuation element that is arranged in said accommodation body and is adapted to cooperate with said fixing element so as to mutually fix said structural elements, characterized in that said fixing element comprises a toothed head that is in one piece with a stem of a screw, said head being coupled rotatably within said accommodation body and said screw stem protruding from said accommodation body, said actuation element comprising a crown gear that is adapted to actuate said head in order to screw the screw stem into the second structural element.

This solution suffers drawbacks: a high production and assembly cost is in fact noted, due to the structural complexity of the joint, the need to provide the joint in various sizes/dimensions as a function of the thickness of the panel, the need to use the joint on panels with high minimum thicknesses, a considerable aesthetic impact since the joint exposes the flat edge that must be applied so as to affect one edge of the panel, and the need to provide two holes/seats on the panel for the placement of the accommodation body and of the pin, the execution of which is complicated.

The accommodation body has a cylindrical shape and is divided diametrically into two components, which must be joined in order to clamp the crown gear and the fixing element: a high degree of clamping might not allow optimum interaction between the gears, while clamping provided with the presence of plays might lead to difficulty in activating the gears due to possible mutual jamming of the teeth.

Furthermore, the crown gear and the fixing element are embedded in the accommodation body: in case of maintenance on the crown gear it is necessary to remove the entire accommodation body from the panel and therefore open, in practice breaking it, the accommodation body in order to access the internal components; in practice, in case of maintenance, it is necessary to replace the entire joint; moreover, the panel is also ruined in this case.

WO 2008/076089 is also known which discloses a solution for obtaining the connection of construction elements such as a panel; this solution comprises a threaded bush and a frame that can be arranged within a hole provided transversely to the panel; the following are placed inside the frame: a first screw, provided with a crown-shaped head; an externally threaded bush, which is associated rotatably with a first complementary thread provided axially with respect to the frame; a pre-compressed spring; a second screw, the head of which has a seat for the accommodation of said spring and of the stem of the first screw; a third screw, which is arranged transversely to said first screw and the head of which interacts with the head of the first screw, according to a pinion-crown gear system.

The elements contained in the frame are fixed stably to the structure of the frame by way of a first threaded ring, which is associated rotatably with a second complementary thread provided axially to the frame, at one end thereof keeping in position the second screw, and a second ring, which is associated rotatably with a third complementary thread that is provided tangentially to the frame, at one end thereof, keeping in position the third screw.

FIG. 6 shows a solution in which a hole is provided in a panel to allow adjustment of the second screw.

This solution, also, suffers drawbacks: the third screw, once screwed to the frame, is fixed in its position and is no longer removable and therefore it is not possible to perform any maintenance in case of malfunctions or wear.

Furthermore, in this solution the head of the first screw works in contrast with an externally threaded bush that is associated rotatably with the first complementary thread provided axially to the frame; if the bush loosens, optimum interaction of the head of the first screw with the head of the second screw is no longer permitted, thus making adjustment unattainable.

A similar remark can be made in relation to the rotatable connection of the second screw to the frame by means of the bush.

This solution is structurally complicated due to the large number of components that constitute the device, requiring a preassembly of the various components to the frame that is long and laborious, furthermore using a spring that is partially pre-compressed.

U.S. Pat. No. 5,743,670A is also known which discloses a joining device, accommodated within a body or structural housing or frame, which is constituted by: a ring gear; a shell that accommodates the stem of the ring gear; a helical spring; a pinion gear; a coupler shaft; a front support.

The coupler shaft is a multi-segment constituted by: a cylindrical segment, which is accommodated at one end inside the shell; a cylindrical central segment, which is provided with a longitudinal retainer slot for a key; a cylindrical collar; a cylindrical coupling segment, which is accommodated in the front support and comprises a longitudinal shaft with a non-threaded segment and a threaded end.

The assembly method of the present known solution provides for a large number of constructive steps and furthermore said solution is structurally complicated due to the large number of components that constitute the device, requiring a preassembly of the various components to the frame that is long and laborious, furthermore using a spring that is partially pre-compressed and additional mechanical means or welds or adhesives as elements for fixing the shell and the front support to the body.

This solution is also particularly expensive in terms of production costs, due to the large number of components required, and in terms of cost and time required for preassembly of the components.

Finally, in this background art document it is found that maintenance or replacement of the activation element, i.e., of the pinion gear, is long, complicated and laborious, since it requires the complete disassembly of the joint since the pinion gear is the first element that is assembled during assembly and since it is not possible to extract it from the opening since the head of the pinion gear has a larger diameter than the opening.

EP1469206 is also known which discloses a solution for connecting construction elements such as panels; this solution comprises a threaded bush, an accommodation body or head and a multi-segment, such as a pin, which can be arranged within a hole provided transversely to the panel.

The cylindrical head is extended along an axis that is perpendicular to the axis of the joint and is constituted by a first head part and a second head part; the head accommodates internally a gear shaped like a threaded tube with external teeth, a part constituted by a toothed rim that is provided in annular fashion on the outer surface of a coaxial sleeve, and one end of the pin.

The pivot is a multi-segment constituted by: a first stem, provided with a thread adapted to mate with the female thread of the sleeve, which can be arranged within the head, the end of which, shaped like a hexagon, is adapted for mating with an actuation key; a cylindrical central portion, on the lateral surface of which there are smooth zones for the insertion of a positioning key; a second stem provided with a thread adapted for mating with the bush.

This solution, too, is structurally complicated and requires a preassembly of the various components to the head that is long and laborious; moreover, the mating of the first and second head parts also requires high precision, since it is necessary to join them mutually frontally by means of pins and corresponding centering holes, taking care that the toothed rim of the sleeve of the part enters axially in abutment on the undercut portion of the axial seat and meshes radially with the teeth of the gear.

Furthermore, it is observed that the fact of mating the first and second head parts diametrically to each other and along an axis that is perpendicular to the fastening direction entails the generation of tensions, during the use of the disclosure, that tend to uncouple the first and second head parts.

Moreover, even in this background art document it is observed that maintenance or replacement of the activation element, i.e. of the gear, is long, complicated and laborious, since it requires the complete disassembly of the joint, since the gear must be assembled before inserting the joint in the panel.

Moreover, it is noted that the fact that the part is constituted by a rim, shaped like a threaded tube with an external set of teeth that acts as a female thread, forces the user to insert in the joint a male element, such as the pin, that must have such a length as to be able to enter, during use, the threaded hole provided in the sleeve of the part and also enter, during use, the bush.

The joint is then fitted partly in one panel and partly in the other panel, giving rise to problems linked to the space occupation of the pin assembled on the panel that limit the possibility to pre-assemble the parts before the packaging of the panels, in addition to entailing a plurality of assembly operations (at least one per panel).

Finally, it is noted that since the pin is threaded in both ends, during the release of the joint one cannot know in advance whether one will unscrew the sleeve-pin coupling or the bush-pin coupling.

SUMMARY

The aim of the present disclosure is to eliminate the drawbacks noted above, by providing a joining device that is structurally compact, can be used also on panels that have a low thickness and requires, for its installation, limited work on the panel, so as to maximize the utilization of the space generated by the work on the panel to provide the disclosure.

Within this aim, the present disclosure provides a joining device that has a limited impact on the panel and the activation of which is simple and effective over time regardless of the machining tolerances both in the panel and in the joint.

The disclosure also provides a joining device on which it is possible to perform maintenance on the activation element rapidly and easily, preserving the integrity of the joint and of the panel.

The disclosure further provides a joining device that allows to achieve an optimum activation thereof, compensating the forces that tend to space the gears.

The disclosure also provides a joining device the assembly of which to the panel is simple and easy.

The disclosure further provides a joining device that has low manufacturing costs and can be provided with usual and known systems.

These features and advantages that will become better apparent hereinafter, are achieved by providing a joining device, particularly for joining a shelf to a wall of a piece of furniture, comprising a cylindrical body that can be associated in a first hole adapted to be provided transversely in said shelf and provided with a first axial seat for the rotatable coupling of the first stem of a screw provided with a first crown-shaped head that can be arranged rotatably within a second seat that is adjacent to said first seat, characterized in that said cylindrical body is provided with a third seat, which is perpendicular and connected to said second seat, for the temporary coupling of a pinion, which interacts with said first crown-shaped head, which protrudes externally to said cylindrical body and is accommodated within a second hole adapted to be provided in said shelf

BRIEF DESCRIPTION OF THE DRAWINGS

Further characteristics and advantages of the disclosure will become better apparent from the detailed description of a particular but not exclusive embodiment of the joining device according to the present disclosure, illustrated by way of nonlimiting example in the accompanying drawings, wherein.

DETAILED DESCRIPTION OF THE DRAWINGS

Figure 1:
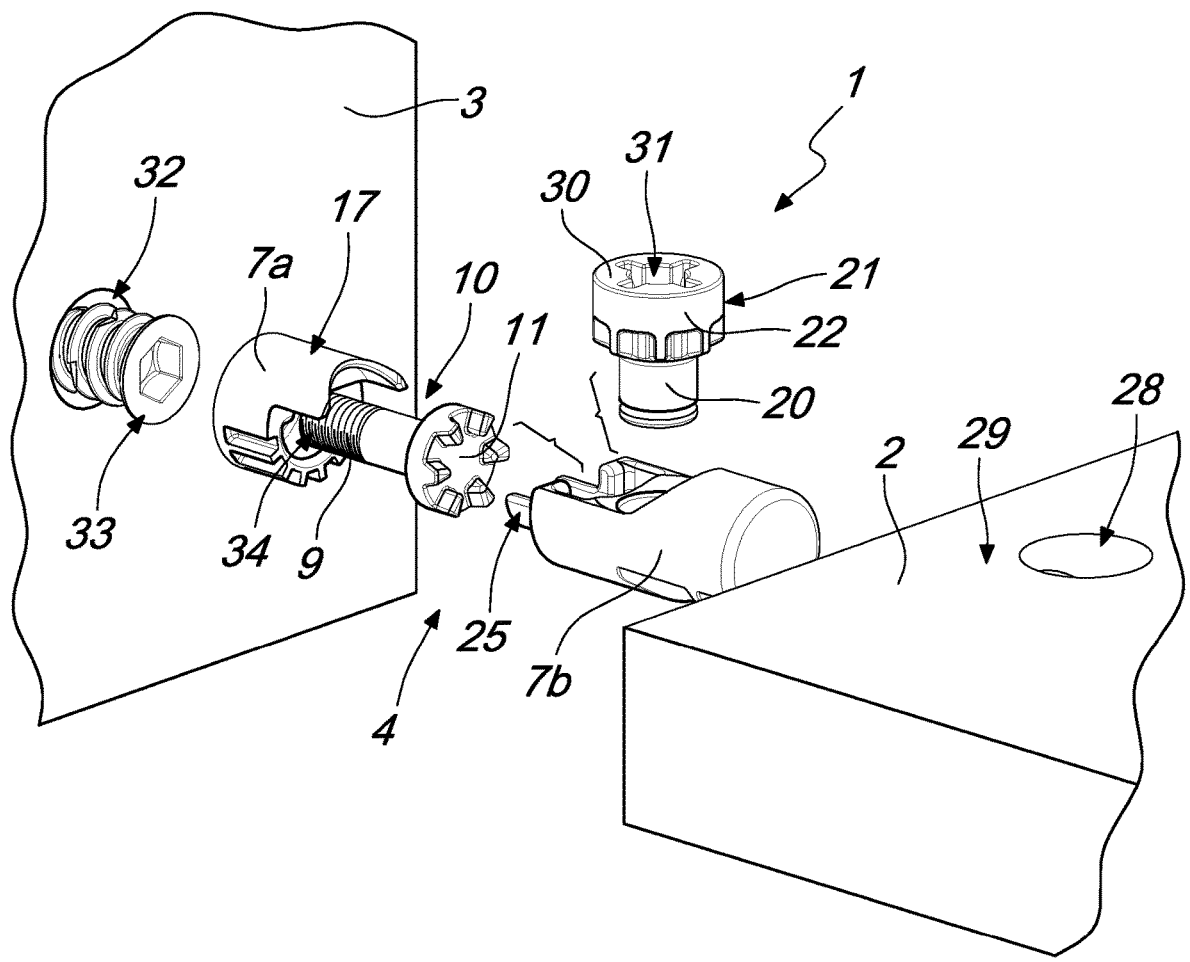
FIG. 1 is an exploded view of a joining device with the cylindrical body constituted by two half-shells.
Figure 2:
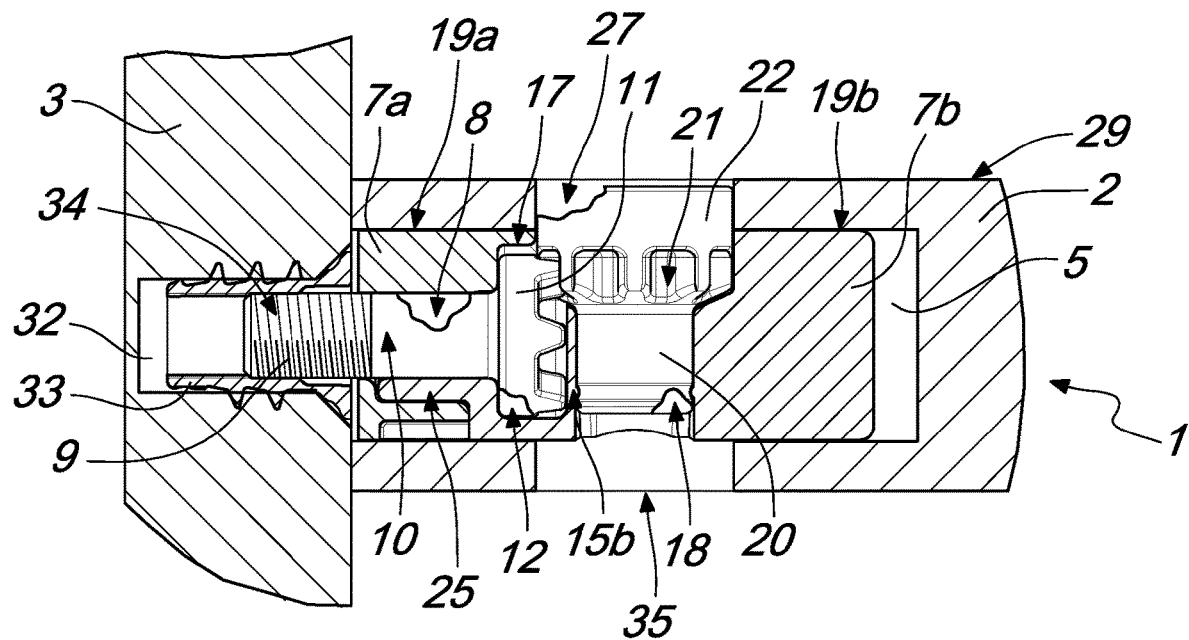
FIG. 2 is a sectional view of the joining device.
Figure 3:
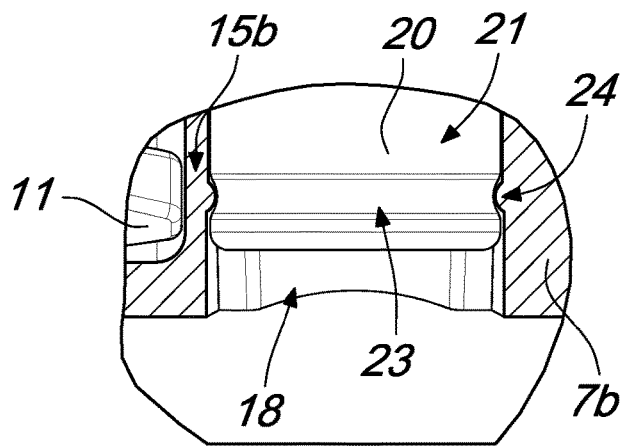
FIG. 3 is a view of a detail according to the FIG. 2.
Figure 4:
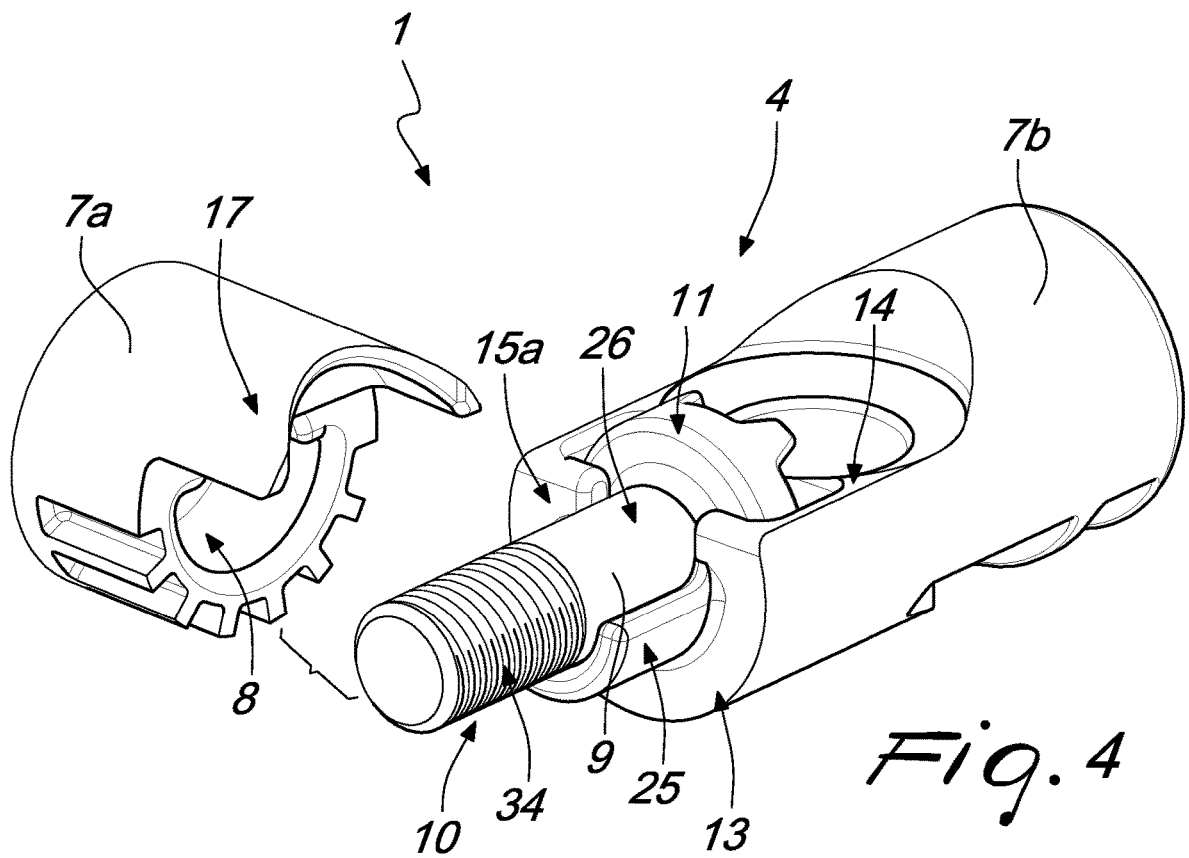
FIG. 4 is a side perspective view of the cylindrical body.
Figure 5:
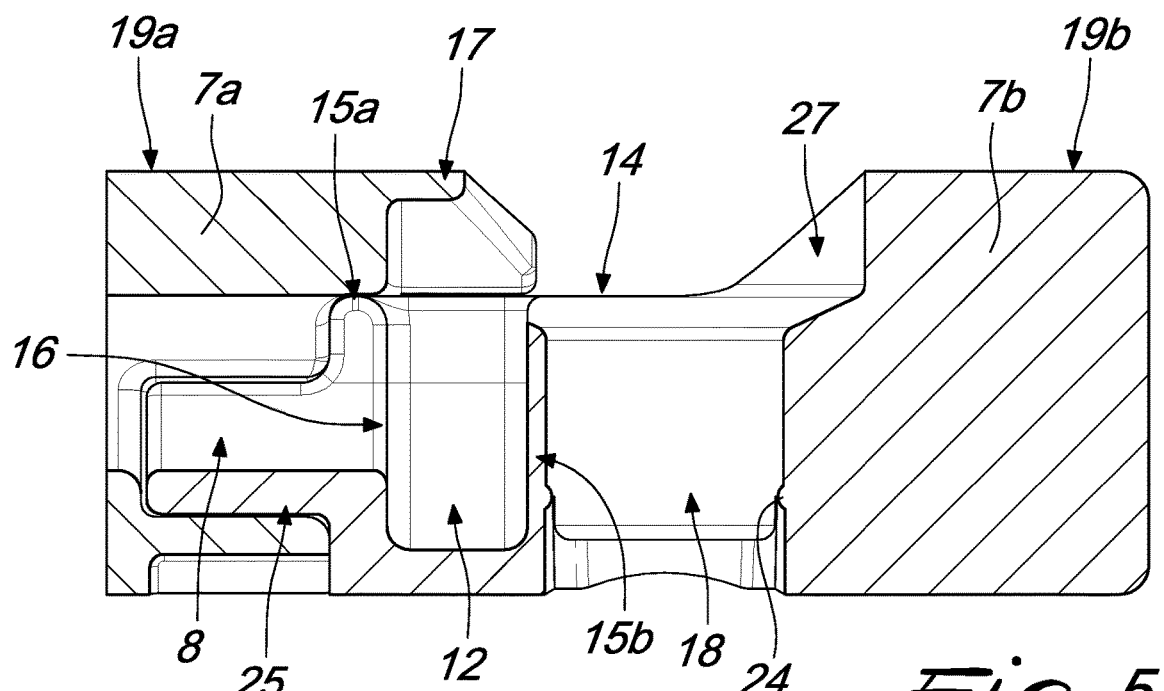
FIG. 5 is a sectional view of the cylindrical body without the pinion and the screw with crown-shaped head.
Figure 6:
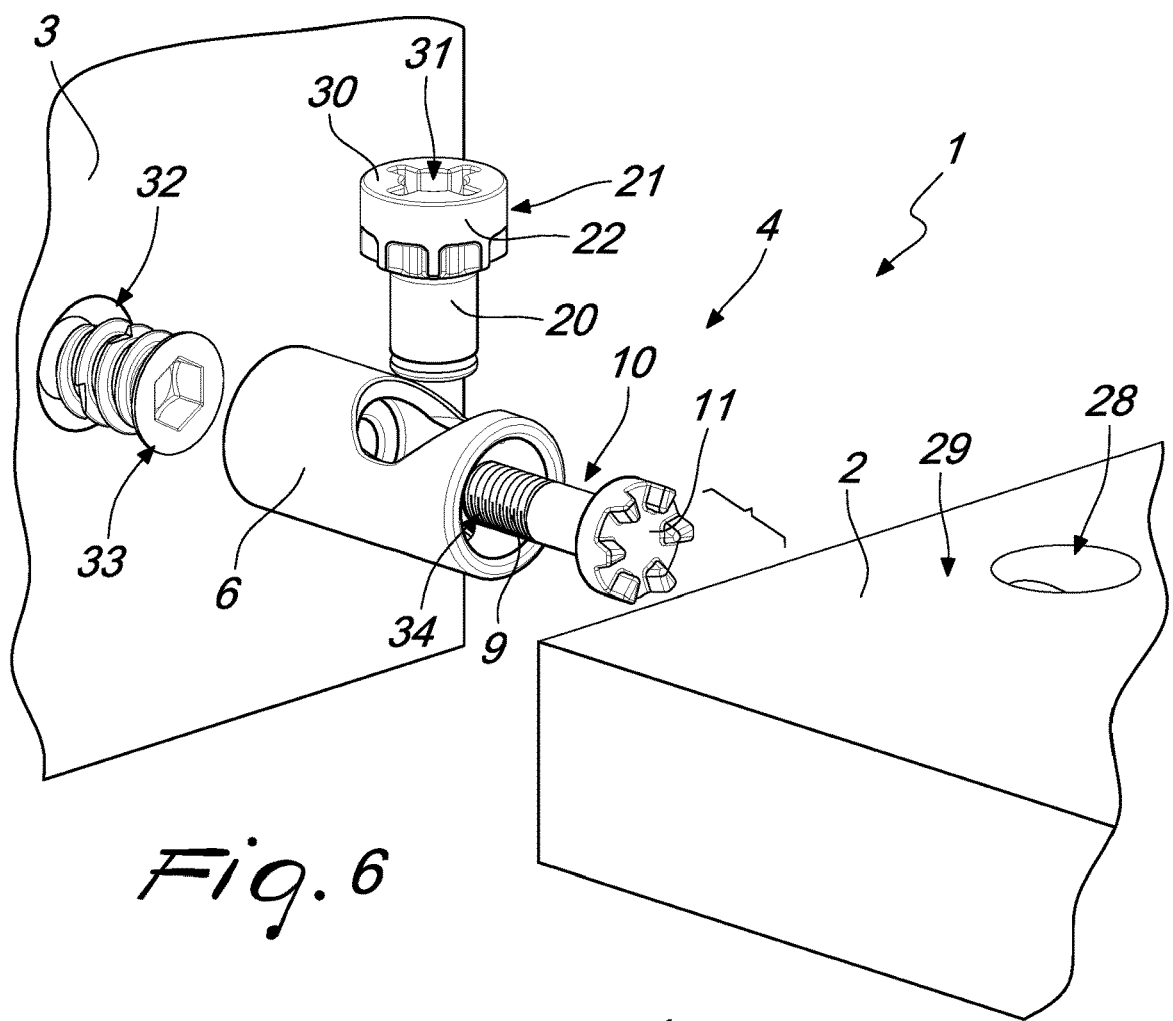
FIG. 6 is a view similar to FIG. 1, with the cylindrical body composed of a single component.
Figure 7:
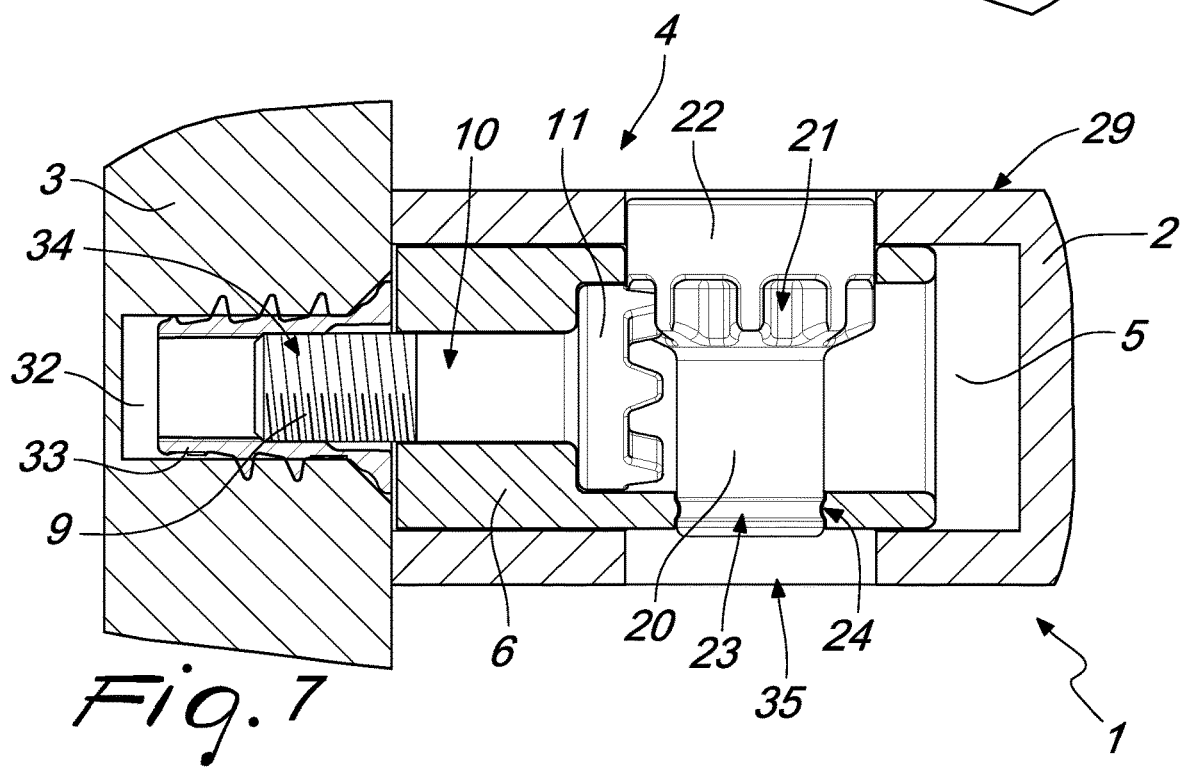
FIG. 7 is a view similar to FIG. 2, with the cylindrical body constituted by a single component.

In the exemplary embodiments that follow, individual characteristics, given in relation to specific examples, may actually be interchanged with other different characteristics that exist in other exemplary embodiments.

Moreover, it is noted that anything found to be already known during the patenting process is understood not to be claimed and to be the subject of a disclaimer.

With reference to the figures, the reference numeral 1 designates a joining device, particularly for joining a shelf 2 to a wall 3 of a piece of furniture.

The joining device 1 is constituted by a cylindrical body 4, which can be associated within a complementarily shaped first hole 5 that is adapted to be provided transversely in the shelf 2 through part of its thickness.

The cylindrical body 4 can be composed of a single shell 6 or of a first half-shell and a second half-shell 7a, 7b which can be mutually coupled axially with front coupling.

In this last case, the first half-shell 7a has a substantially cylindrical and internally hollow shape, so as to define a first axial seat 8 for the rotary coupling of a first stem 9 of a screw 10 provided with a first crown-shaped head 11.

The first head 11 of the screw 10 can be arranged rotatably within a second seat 12 provided proximate to the end 13, cut along a chord so as to define a flat portion 14, of said second half-shell 7b that is directed toward said first half-shell 7a.

Such second seat 12 is obtained along a plane that is perpendicular to the plane of arrangement of the first seat 8, has a substantially semicircular shape and lies between two partitions 15a, 15b, of which the front one 15a, directed towards the first half-shell 7a, has a semicircular opening 16 for the placement and passage of the first stem 9, along the same axis as the first seat 8.

Part of the first head 11 of the screw 10 therefore protrudes from the second seat 12 and lies below a first tab 17 that protrudes from the first half-shell 7a in the direction of the second half-shell 7b.

The first tab 17 is extended along a circular arc until it surmounts the cut end 13 of the second half-shell 7b and therefore also the underlying first crown-shaped head 11 of the screw 10, once it is associated with said second half-shell 7b.

A third seat 18 is provided on the second half-shell 7b, at right angles to the axis of the first seat 8 and therefore to the axis of the first stem 9 and starting from the flat portion 14, and is open in a downward region and not connected to the adjacent second seat 12.

The distance between the flat portion 14 and the outer perimetric surface 19a, 19b of the first and second half-shells 7a, 7b is substantially equal to the height of the first head 11 of the screw 10, which thus does not protrude beyond the cylindrical body 4.

It is possible to arrange temporarily in the third seat 18 a second stem 20 of a pinion 21 provided with a second head 22 that protrudes outside the cylindrical body 4 and is adapted to couple kinematically with the first head 11 accommodated in the second seat 12.

The temporary interconnection of the second stem 20 occurs by way of the presence of an annular groove 23, which is provided proximate to its end and interacts selectively with an annular ridge 24 that protrudes proximate to the end of the third seat 18.

A stable temporary coupling of the pinion 21 to the cylindrical body 4 is thus achieved.

The second half-shell 7b has, starting from the cut end 13, and so as to surround the opening 16 provided on the front partition 15a, a second tab 25 that protrudes in the direction of the first half-shell 7a so as to trace a circular arc that is concentric to the first seat 8, so as to arrange itself, during the axial coupling of the first half-shell 7a to the second half-shell 7b, within the first seat 8 and adjacent to its internal lateral surface.

The first end 26 of the first stem 9 of the screw 10, which in turn protrudes from the first crown-shaped head 11, rests rotatably on the second tab 25.

The second head 22 of the pinion 21 protrudes from the flat portion 14 and is accommodated within a fourth seat 27 constituted by a second hole 28 that is adapted to be provided in the shelf 2, so as to be internal or substantially flush with the upper surface 29 of said shelf 2.

In this manner, the second head 22 of the pinion 21, in addition to providing motion to the first crown-shaped head 11 of the screw 10, also has the extraction-prevention or bolt function, in that it locks the cylindrical body 4 within the shelf 2.

Means for the engagement of a pressure tool are provided on the second upper end 30 of the second head 22 of the pinion 21 and are constituted by a fifth seat 31 within which it is possible to arrange by pressing a tool such as a screwdriver or a specific tool that operates by pressure.

A third hole 32 is provided transversely in the wall 3 and an internally threaded bushing 33 for interconnection of the third end 34 of the first stem 9 of the screw 10 can be arranged or screwed therein.

The interconnection can also be achieved in a different manner; for example, the first stem 9 can have a thread for chipboard.

A fourth hole 35, axially aligned with the third seat 18, is provided in the lower surface of the shelf 2 that lies opposites the upper surface 29.

In its use, the disclosure is therefore constituted by a joining device 1 of the concealed type, in that it is entirely accommodated both in the shelf 2 and in the wall 3, only the second hole 28 being visible.

When the first and second half-shells 7a, 7b are axially mutually assembled in order to obtain the closed cylindrical body 4 with the screw 10 inside it, the cylindrical body 4 is inserted in the first hole 5.

Then the pinion 21 is inserted in the second seat 18, through the is second hole 28 adapted to be provided in the shelf 2, so as to be locked temporarily to the cylindrical body 4 so as to allow kinematic interaction between the second head 22 and the first head 11.

The rotation imparted to the pinion 21 through the second hole 28 thus allows to screw the first screw 10 to the threaded bushing 33 associated with the wall 3.

It has thus been found that the disclosure has achieved the intended advantages by providing a joining device 1 which is structurally compact, can be assembled rapidly and simply, can also be used on low-thickness panels and requires, for its installation, limited machining on the panel, so as to maximize the utilization of the space generated by the machining on the panel to provide the disclosure, also avoiding spoiling it.

Furthermore, it has a scarce impact on the panel due to its concealed insertion, since the joining device 1 is accommodated entirely both in the shelf 2 and in the wall 3, only the second hole 28 being visible.

Furthermore, it has been observed that the activation of the pinion 21 is simple and effective over time regardless of the machining tolerances both in the panel and in the components of the device; the simple rotation imparted to the pinion 21 through the second hole 28 in fact allows to screw the first screw 10 into the threaded bushing 33 associated with the wall 3.

Furthermore, it has been found that the second head 22 of the pinion 21 also performs the extraction-prevention or bolt function, thanks to the fact that the pinion 21 protrudes outside the cylindrical body 4 and is accommodated within the second hole 28 adapted to be provided in the shelf 2, so as to be internally or substantially flush with the upper surface 29 of the shelf 2, thus allowing to lock the cylindrical body 4 within the shelf 2.

Finally, it has been observed that maintenance of the pinion 21 can occur rapidly and easily, since it is simply removable from the cylindrical body 4 through the second hole 28 in which it is accommodated, without having to extract the cylindrical body 4 from the shelf 2 and being equally is simply replaceable.

Obviously the disclosure is susceptible of numerous modifications and variations. The materials used, as well as the dimensions that constitute the individual components of the disclosure, may of course be more pertinent according to the specific requirements.

The characteristics indicated as advantageous, convenient or the like may also be omitted or be replaced with equivalents.

The disclosures in Italian Patent Application No. 102015000028413 (UB2015A001736) from which this application claims priority are incorporated herein by reference.

The invention claimed is:

1. A joining device, for joining a shelf to a wall of a piece of furniture, the joining device comprising: a cylindrical body that can be associated in a first hole adapted to be provided transversely in said shelf and provided with a first axial seat for the rotatable coupling of the first stem of a screw provided with a first crown-shaped head that can be arranged rotatably within a second seat adjacent to said first seat, wherein said cylindrical body is provided with a third seat, perpendicular and connected to said second seat, for the temporary coupling of a pinion, which interacts with said first crown-shaped head, which protrudes externally to said cylindrical body and is accommodated within a second hole adapted to be provided in said shelf, wherein said second stem of said pinion can be associated selectively and temporarily with said cylindrical body, said second stem being provided with an annular groove, which is provided proximate to its end, which interacts selectively with an annular ridge which protrudes proximate to the end of said third seat.

2. The joining device according to claim 1, wherein said third seat, open in a lower region, is provided in said cylindrical body, provided in a single shell or in first and second half-shells, at right angles to the axis of said first seat and therefore to the axis of said first stem, said first head of said screw not protruding beyond said cylindrical body, a second stem of said pinion being arrangeable temporarily in said third seat and being in turn provided with a second head that protrudes outside said cylindrical body and is adapted to couple kinematically to said first head accommodated in said second seat.

3. The joining device according to claim 2, wherein said second head of said pinion protrudes from an outer perimetric surface of said cylindrical body and is accommodated within a fourth seat constituted by said second hole adapted to be provided in said shelf, so as to be internally or substantially flush with an upper surface of said shelf, said shelf having a fourth hole adapted to be provided at the wall that lies opposite said upper surface, so as to be axially aligned with said third seat of said cylindrical body.

4. The joining device according to claim 2, wherein said second head of said pinion is adapted to provide motion to said first crown-shaped head and also has an extraction prevention or bolt function, locking said cylindrical body inside said shelf.

5. The joining device according to claim 2, wherein on a second upper end of said second head of said pinion there are means for the engagement of a pressure tool, said means being constituted by a fifth seat within which a tool can be arranged by pressing.

6. The joining device according to claim 2, wherein said cylindrical body is composed of said first and second half-shells, which can be mutually coupled axially with a front coupling, said first half-shell having a substantially cylindrical and internally hollow shape, so as to define said first axial seat for the rotatable coupling of said first stem, said first head of said screw being rotatably arrangeable within said second seat provided proximate to an end, which is cut according to a chord so as to define a flat portion of said second half-shell that is directed toward said first half-shell.

7. The joining device according to claim 6, wherein part of said first head of said screw protrudes from said second seat and lies below a first tab that protrudes from said first half-shell in the direction of said second half-shell, said first tab being extended along a circular arc until it surmounts said cut end of said second half-shell and therefore also said underlying first crown-shaped head, once it is associated with said second half-shell.

8. The joining device according to claim 7, wherein said second half-shell has, starting from said cut end, and so as to surround said opening provided on said front partition, a second tab that protrudes in the direction of said first half-shell so as to trace a circular arc that is concentric to said first seat so as to arrange itself, during the axial coupling of said first half-shell to said second half-shell, within said first seat and adjacent to its internal lateral surface, the first end of said first stem of said screw resting rotatably on said second tab and in turn protruding from said first crown-shaped head.

9. The joining device according to claim 2, wherein said second seat is provided along a plane that is perpendicular to the plane of arrangement of said first seat, has a substantially semicircular shape, and acts between two partitions, of which the front one, directed toward said first half-shell, is provided with a semicircular opening for the placement and passage of said first stem, along the same axis as said first seat.

10. The joining device according to claim 1, wherein a third hole is provided transversely in said wall for the interconnection of a third end of said first stem of said screw, said first stem being provided with a thread for chipboard or being associable with a bushing arranged within said third hole.

* * * * *